John W. Smith's Ceremonial Bell.
Plate 1.

No. 110875

PATENTED JAN 10 1871

Inventor
John W. Smith
by
Munn, Fenwick & Lawrence

Witnesses
R. T. Campbell
J. N. Campbell

John W. Smith's Ceremonial Bell.
Plate 2.

Witnesses
R. T. Campbell
J. N. Campbell

Inventor
John W. Smith
by Mason, Fenwick & Lawrence

United States Patent Office.

JOHN W. SMITH, OF KEOKUK, IOWA.

Letters Patent No. 110,875, dated January 10, 1871.

IMPROVEMENT IN CEREMONIAL BELLS.

The Schedule referred to in these Letters Patent and making part of the same.

*To all whom it may concern:*

Be it known that I, JOHN W. SMITH, of Keokuk, in the county of Lee and State of Iowa, have invented certain new and useful Improvements in Ceremonial Bells; and I do hereby declare that the following is a full, clear, and exact description thereof, reference being had to the accompanying drawing making part of this specification, in which—

Figure 1:
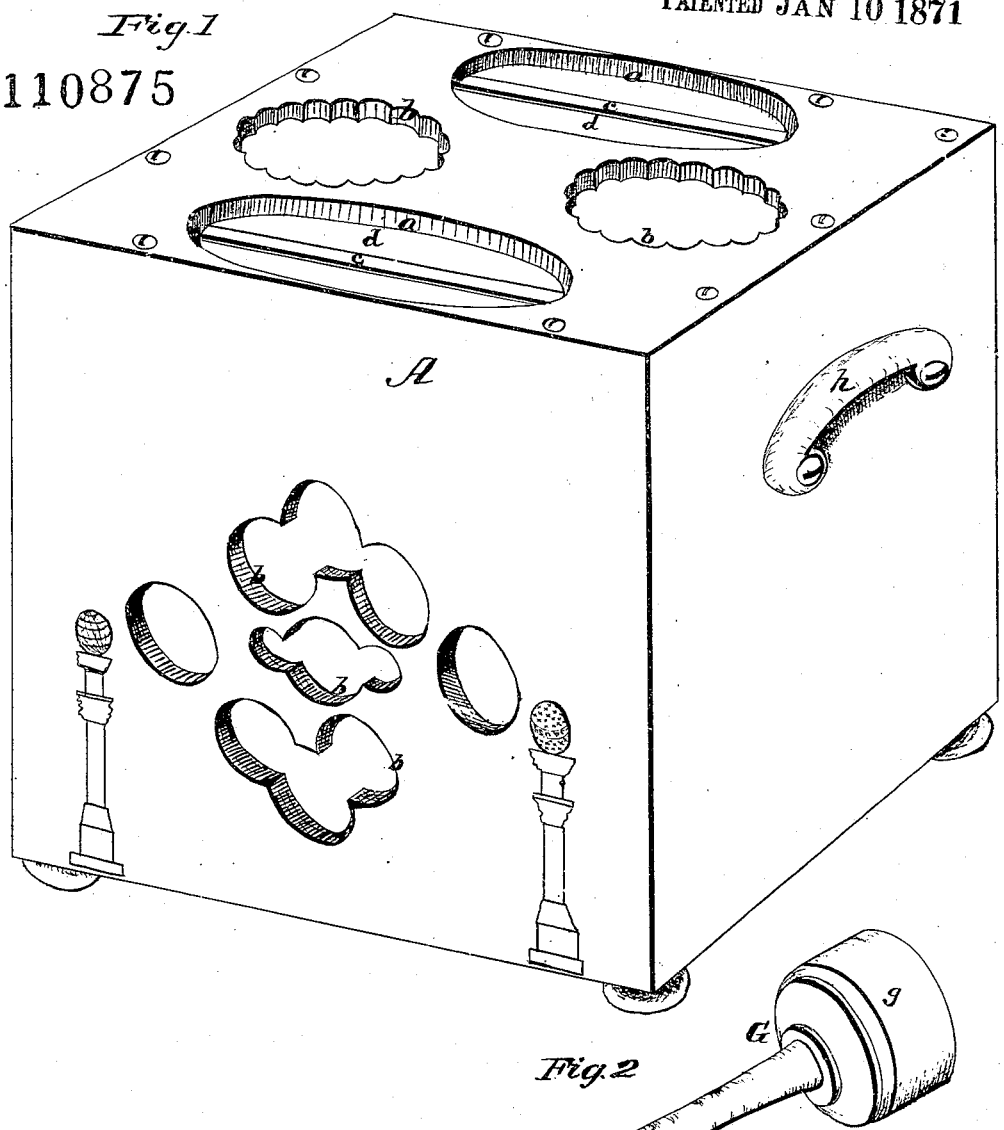

Figure 1, plate 1, is a perspective view of the case containing the bells.

Figure 2:
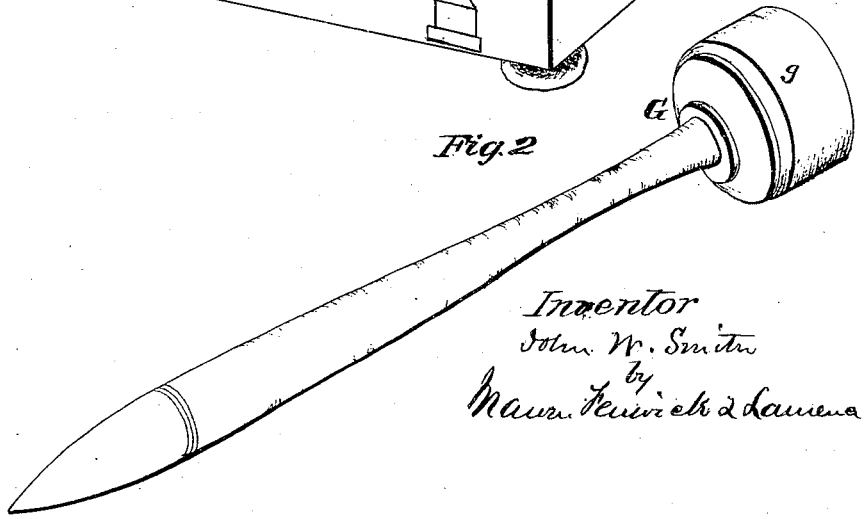

Figure 2, plate 1, is a perspective view of a gavel adapted for use with the improved bells.

Figure 3:
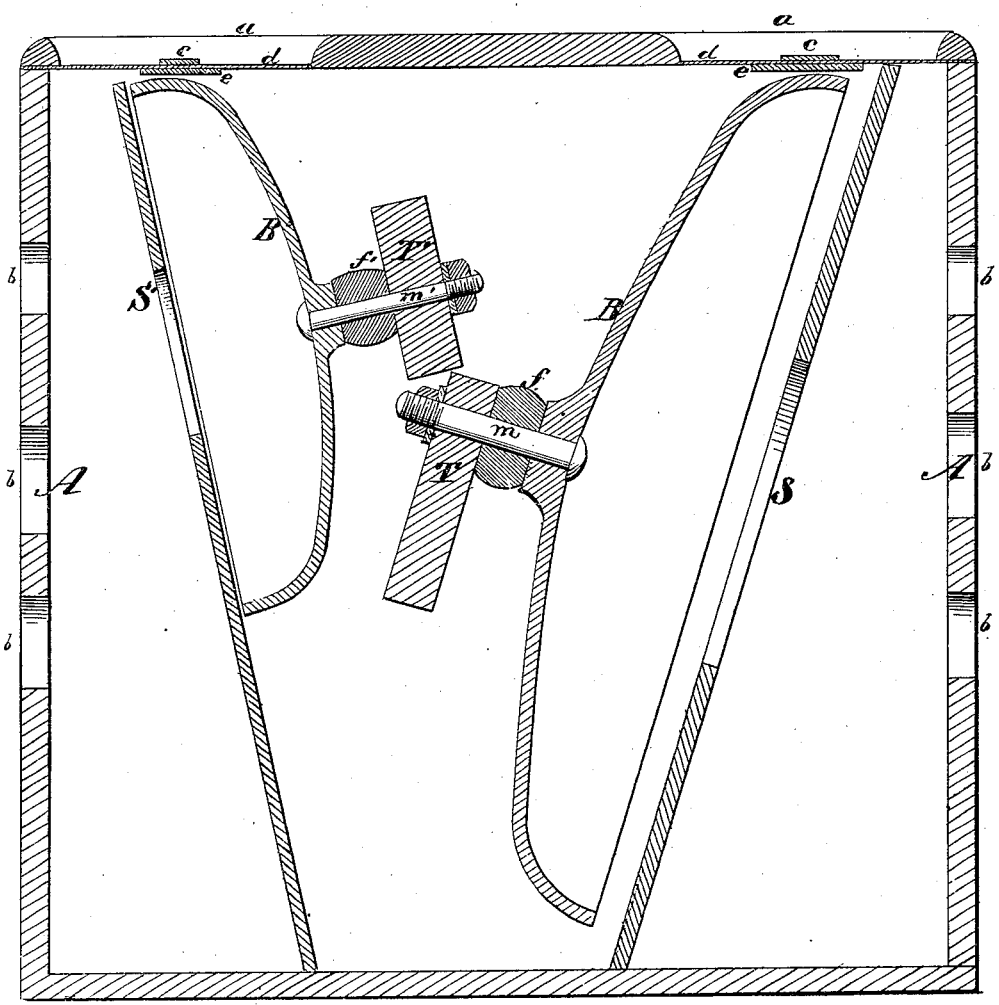

Figure 3, plate 2, is a sectional view of the case and bells.

Similar letters of reference indicate corresponding parts in the several figures.

This invention relates to an improvement which is designed for use during certain ceremonies, which are conducted by various secret and other societies, wherein they require the tones of a bell-gong.

The nature of my invention consists—

First, in the arrangement of one or more bells or gongs, within a suitable case or box, in such manner, that, while they can be conveniently struck by means of a gavel held in the hand, they will not be exposed to view, as will be hereinafter explained.

Second, in a mode of mounting a bell or gong within a portable inclosing case, whereby full and deep tones can be produced, as will be hereinafter explained.

Third, in the employment of an elastic strip across the aperture of the case, through which aperture the bell is struck, as will be hereinafter explained.

The following description of my invention will enable those skilled in the art to understand it.

In the accompanying drawing—

A represents a box or case, which may be rectangular or of any other suitable shape, and which is preferably made of dry or seasoned wood, carved and ornamented in any manner suited to the taste.

This box or case is perforated at *a b*, mounted on feet and provided with handles, *h*.

The perforations or openings through the sides and top of the box are covered by some suitable cloth, *d*, and across the two openings *a a*, narrow elastic strips *e* are tightly stretched.

By reference to plate 2, figure 3, the interior of the box A will be seen.

Two bells or gongs B B' are so arranged in the case A, with reference to the openings *a a*, that their peripheries can be struck by means of a gavel, G, shown by fig. 2, or by any other suitable instrument.

For some purposes only one bell or gong will be required, but be there one or several, they will all be mounted precisely alike.

The larger bell B is arranged in a slightly inclined position, and secured to a fixed cross-bar T, by means of a bolt and nut, *m*, and an india-rubber cushion, *f*.

The ends of the bar T are secured to the ends of the case A, and between this bar T and the hub which surrounds the eye of the bell, the rubber cushion *f* is compressed. If the bell was secured rigidly to the bar T, in direct contact with it, the tone of the bell would be sharp and more or less harsh, but by the interposition of the rubber cushion *f*, as described, the bell will have a full round tone, better suited to the object for which it is intended.

The elastic strip *e*, which is stretched across the opening *a*, beneath the cloth, prevents this cloth from touching the bell, and also operates by its recoil, after being struck by the gavel G, to regulate the round.

In front of the bell B is a sounding-board, S, which is perforated to conduct the sound in the direction of the openings *b*, through the vertical sides of the case A. This board may be removed by sliding it out of grooves which receive its edges.

If, in addition to the larger bell B, another one, possessing sharper tones, is required, this B' will be arranged as represented in fig. 3.

T' is the cross-bar of this bell;

B', *m'*, the bolt and nut by which it is secured to said cross-bar;

*f'*, its elastic cushion; and

S', its sounding board, which latter is perforated like the board S, and for the same reason.

The gavel which I prefer to employ has a long handle attached to a cylindrical head, the periphery of which latter is covered with velvet or some other suitable soft material, *g*. If a solemn tone is desired, the covered part *g* is caused to strike upon the bell; and if a shrill, sharp, tone is required, the end of the gavel-head is used as the striking part.

The apparatus which I have above described will present a handsome appearance if properly finished, and is adapted for use in halls and lodge rooms, as well as in processions.

Having described my invention,

What I claim as new, and desire to secure by Letters Patent, is—

1. The ceremonial apparatus herein described, consisting of the case A, essentially as described, with one or more bells B arranged within it, and with one or more holes *a*, for the admission of a striking instrument, substantially as described.

2. The arrangement of the cushion *f* with the bell B, within a perforated ceremonial bell-case A, substantially in the manner described.

3. The elastic strip *e*, stretched across the opening *a*, directly over the bell, substantially as described.

4. The arrangement of the bell B and perforated sounding-board S within the ceremonial bell-case A, substantially in the manner and for the purpose described.

JOHN W. SMITH.

Witnesses:
P. W. POTTER,
P. T. LOMAX.